(12) United States Patent
Jeon

(10) Patent No.: US 8,328,689 B2
(45) Date of Patent: Dec. 11, 2012

(54) SHIFT CONTROL METHOD AND SYSTEM OF AUTOMATIC TRANSMISSION

(75) Inventor: Byeong Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 705 days.

(21) Appl. No.: 12/506,174

(22) Filed: Jul. 20, 2009

(65) Prior Publication Data
US 2010/0137101 A1 Jun. 3, 2010

(30) Foreign Application Priority Data
Nov. 28, 2008 (KR) .................. 10-2008-0120051

(51) Int. Cl.
*F16H 61/26* (2006.01)
(52) U.S. Cl. ........... 477/156; 477/79; 477/127; 477/130
(58) Field of Classification Search .................. 477/77, 477/79, 80, 83, 84, 115–117, 127, 130, 133, 477/135, 136, 141, 156, 159; 475/116, 118, 475/120, 121, 127
See application file for complete search history.

(56) References Cited

U.S. PATENT DOCUMENTS

| | | | | |
|---|---|---|---|---|
| 4,616,521 A | * | 10/1986 | Akashi et al. | 74/335 |
| 6,832,940 B2 | * | 12/2004 | Itoi | 440/86 |
| 7,324,885 B2 | * | 1/2008 | Sah et al. | 701/58 |
| 7,582,035 B2 | * | 9/2009 | Ootsuki et al. | 475/121 |
| 2004/0242367 A1 | * | 12/2004 | Miyazaki et al. | 475/280 |

FOREIGN PATENT DOCUMENTS
KR 10-2008-0012173 A 2/2008

\* cited by examiner

*Primary Examiner* — Justin Holmes
(74) *Attorney, Agent, or Firm* — Morgan, Lewis & Bockius LLP

(57) ABSTRACT

A shift control method of an automatic transmission controls a skip shift from a first shift-speed achieved by engagements of first and second frictional elements to a second shift-speed achieved by engagements of third and fourth frictional elements, wherein the engagements of the third and fourth frictional elements is controlled after completion of releases of the first and second frictional elements.

30 Claims, 6 Drawing Sheets

FIG.2

|    | D1 | D2 | D3 | D4 | D5 | D6 | R |
|----|----|----|----|----|----|----|---|
| F1 | ●  |    |    |    |    |    |   |
| B3 |    |    |    |    |    |    | ● |
| B2 |    | ●  |    |    | ●  |    |   |
| C2 |    |    | ●  |    | ●  |    | ● |
| C1 |    |    |    | ●  | ●  | ●  |   |
| B1 | ●  | ●  | ●  | ●  |    |    |   |

SHIFT CONTROL METHOD AND SYSTEM OF AUTOMATIC TRANSMISSION

CROSS-REFERENCE TO RELATED APPLICATION

The present application claims priority to Korean Patent Application Number 10-2008-0120051 filed Nov. 28, 2008, the entire contents of which application is incorporated herein for all purposes by this reference.

BACKGROUND OF THE INVENTION

1. Field of the Invention

The present invention relates to a shift control method and a shift control system of an automatic transmission. More particularly, the present invention relates to a shift control method and a shift control system of an automatic transmission that control a shift from an N shift-speed achieved by engagements of first and second frictional elements to an N−3 shift-speed achieved by engagements of third and fourth frictional elements.

2. Description of Related Art

Generally, one frictional element is released and another frictional element is engaged according to a clutch-to-clutch shift control. However, during a specific skip-shifting process, two frictional elements may be released and two other frictional elements may be engaged.

Particularly, in the case of a kick-down 6 to 3 skip shift where three speed steps are shifted, generally two frictional elements must be released and two other frictional elements must be engaged. However, it is understood that shift control of releasing two frictional elements and engaging two other frictional elements is hard to be realized since the hydraulic pressure supplied to four frictional elements must be simultaneously controlled.

Therefore, much research on two shifting processes that are successively performed in the case of a skip shift, such as a 6 to 3 shift, has been conducted. For example, a 4 to 3 shift is performed after a 6 to 4 shift is completed so as to perform a 6 to 3 shift.

However, according to such a conventional 6 to 3 skip shift control method, since two shifting processes are successively performed, shifting time may be long. That is, since the 4 to 3 shift is performed after the 6 to 4 shift is completed, the shifting time may be long.

In addition, since the 4 to 3 shift is performed after the 6 to 4 shift is completed, the shifting process may not be smoothly performed and shift feel deteriorates.

To solve such problems, many shift control methods of an automatic transmission where a first shift from a 6 shift-speed to a 4 shift-speed and a second shift from the 4 shift-speed to a 3 shift-speed are overlapped have been researched. In such a shift control method, a second shift from an intermediate shift-speed between the 6 shift-speed and the 3 shift-speed to the 3 shift-speed is overlapped with a first shift from the 6 shift-speed to the intermediate shift-speed when a 6 to 3 shift signal is detected.

However, according to such a shift control method, an output torque of the intermediate shift-speed may be generated and a double shift feel may be felt since shifting from the 6 shift-speed to the 3 shift-speed is performed by way of the intermediate shift-speed. Further, shift shock may occur.

More concretely, in a case in which a shift is performed according to the conventional shift control method, a turbine speed remains at the intermediate shift-speed for a while, and output torque fluctuates seriously, as shown in FIG. 7.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a shift control method and a shift control system of an automatic transmission having advantages of improving shift feel by preventing achievement of an intermediate shift-speed between an N shift-speed and an N−3 shift-speed when a shift from the N shift-speed to the N−3 shift-speed is performed.

A shift control method of an automatic transmission according to various embodiments of the present invention may control a skip shift from a first shift-speed achieved by engagements of first and second frictional elements to a second shift-speed achieved by engagements of third and fourth frictional elements, wherein the engagements of the third and fourth frictional elements is controlled after completion of releases of the first and second frictional elements.

The releases of the first and second frictional elements may be simultaneously performed.

The engagements of the third and fourth frictional elements may be simultaneously performed.

The releases of the first and second frictional elements may be completed at a shift begin point.

The releases of the first and second frictional elements may include: reducing hydraulic pressure by a first hydraulic pressure slope until a first predetermined time after a shift signal is input; reducing the hydraulic pressure by a second hydraulic pressure slope from the first predetermined time to the shift begin point; and reducing the hydraulic pressure to 0.

The shift begin point may be a point when a second predetermined time has passed after the shift signal is input.

The engagements of the third and fourth frictional elements may begin when an engagement begin point is reached after the completion of the releases of the first and second frictional elements.

A turbine speed may be increased by increase of an engine speed without controlling the hydraulic pressure supplied to the frictional elements from the shift begin point to the engagement begin point.

The engagement begin point may be reached when the turbine speed is faster than or equal to a first predetermined turbine speed.

The engagements of the third and fourth frictional elements may include: maintaining a pre-fill pressure during a third predetermined time after the hydraulic pressure is quickly increased to the pre-fill pressure; maintaining a stand-by pressure during a fourth predetermined time after the hydraulic pressure is quickly reduced to the stand-by pressure; and increasing the hydraulic pressure by a third hydraulic pressure slope.

An engine torque reduction control may begin when a torque reduction point is reached while engaging the third and fourth frictional elements.

The engine torque reduction control may include: reducing an engine torque quickly by an offset; and increasing the engine torque gradually until the engagements of the third and fourth frictional elements are completed.

The offset may be determined according to a turbine speed slope.

The torque reduction point may be reached when the turbine speed is faster than or equal to a second predetermined turbine speed.

The engine torque reduction control may further include recovering the engine torque in a case that the engagements of the third and fourth frictional elements are completed.

A shift control system of an automatic transmission according to other embodiments of the present invention may include a transmission control unit controlling a shift and an engine control unit controlling an engine torque, based on a driving condition of a vehicle, wherein the transmission control unit controls the shift from a first shift-speed achieved by engagements of first and second frictional elements to a second shift-speed achieved by engagement of third and fourth frictional elements, and wherein the transmission control unit controls the engagements of the third and fourth frictional elements after the engagements of the first and second frictional elements are completed.

Releases of the first and second frictional elements may be simultaneously performed.

The engagements of the third and fourth frictional elements may be simultaneously performed.

The transmission control unit may control the releases of the first and second frictional elements to be completed at a shift begin point.

The transmission control unit may begin the engagements of the third and fourth frictional elements when an engagement begin point is reached after the releases of the first and second frictional elements are completed.

The engagement begin point may be reached when a turbine speed is faster than or equal to a first predetermined turbine speed.

The engine control unit may perform an engine torque reduction control when a torque reduction point is reached while the transmission control unit controls the engagements of the third and fourth frictional elements.

The torque reduction point may be reached when the turbine speed is faster than or equal to a second predetermined turbine speed.

The engine control unit may recover an engine torque after the transmission control unit completes the engagements of the third and fourth frictional elements.

A shift control method of an automatic transmission according to other embodiments of the present invention may control a skip shift from a first shift-speed achieved by an engagement of at least one off-going element to a second shift-speed achieved by an engagement of at least one on-coming element, wherein a shift control is performed after a release of the off-going element is completed such that an intermediate shift-speed between the first shift-speed and the second shift-speed is not achieved.

A neutral control where hydraulic pressure supplied to the on-coming and off-going elements is not controlled may be performed before the on-coming element is engaged after the off-going element is released.

A shift control method of an automatic transmission according to other embodiments of the present invention may control a skip shift from a first shift-speed to a second shift-speed, wherein an engagement of an on-coming element that is engaged at the second shift-speed begins after a release control of an off-going element that is engaged at the first shift-speed begins, and the engagement of the on-coming element is completed after the release of the off-going element is completed, and wherein the release control of the off-going elements are simultaneously begun in a case that at least two off-going elements exist.

A shift control method of an automatic transmission according to other embodiments of the present invention may control a skip shift from a first shift-speed to a second shift-speed, wherein an engagement of at least one on-coming element that is engaged at the second shift-speed begins after a release control of at least one off-going element that is engaged at the first shift-speed begins, and the engagement of at least one on-coming element is completed after the release of at least one off-going element is completed, and wherein the engagements of the on-coming elements are simultaneously completed in a case that at least two on-coming elements exist.

A shift control method of an automatic transmission according to other embodiments of the present invention may control a skip shift from a first shift-speed to a second shift-speed, wherein a neutral control where hydraulic pressure supplied to frictional elements is not controlled is performed before an engagement of at least one on-coming element that is engaged at the second shift-speed begins after a release control of at least one off-going element that is engaged at the first shift-speed begins.

A shift control method of an automatic transmission according to other embodiments of the present invention may control a skip shift from a first shift-speed achieved by engagements of first and second frictional elements to a second shift-speed achieved by engagements of third and fourth frictional elements and shifted by two speed steps from the first shift-speed, wherein a neutral control where hydraulic pressure supplied to the frictional elements is not controlled is performed before the engagements of the third and fourth frictional elements are controlled after the releases of the first and second frictional elements are completed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of an exemplary power train of an automatic transmission that is applicable to a shift control method of an automatic transmission according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
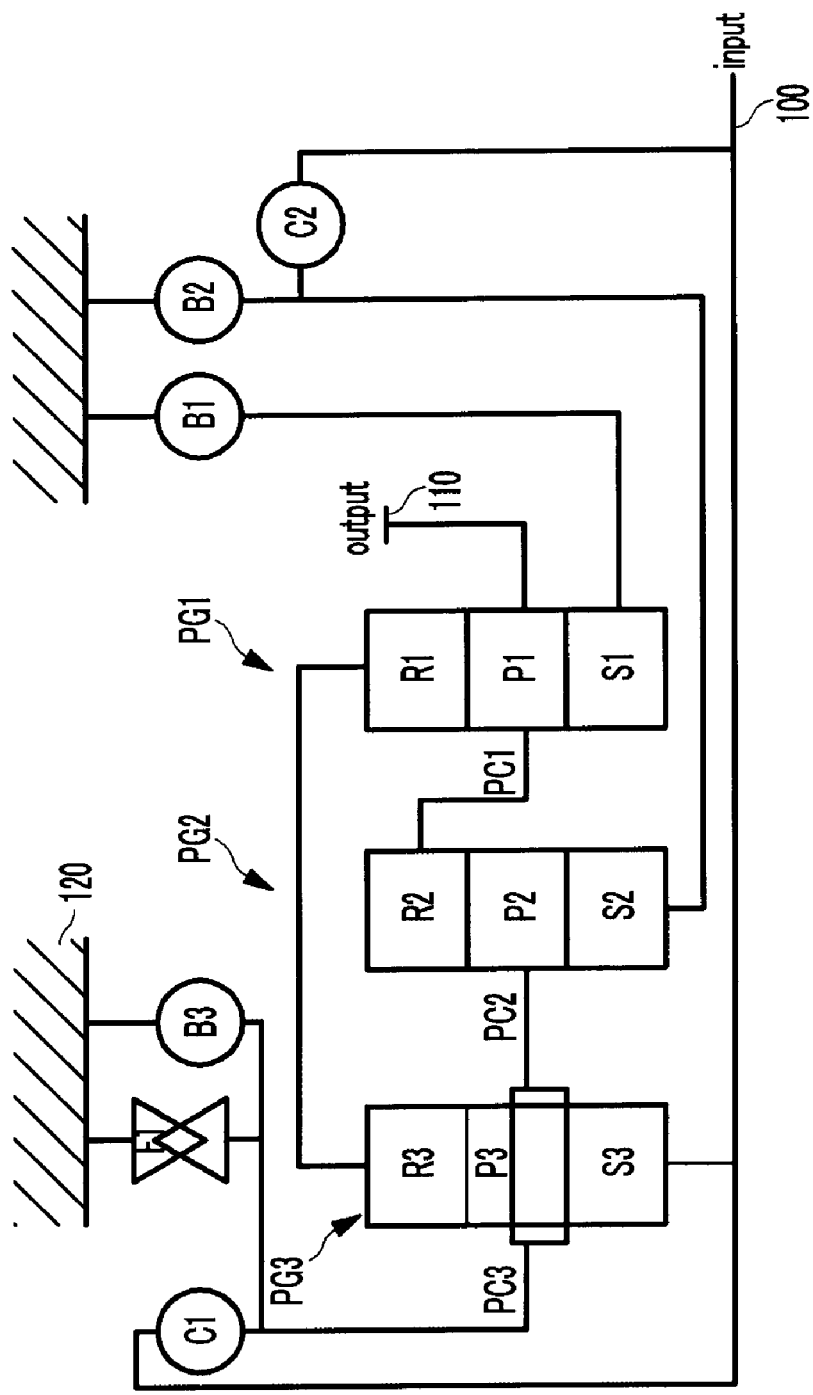
FIG. 1 is a schematic diagram of an exemplary power train of an automatic transmission applicable to a shift control method of an automatic transmission according to the present invention.

FIG. 1 is a schematic diagram of a power train of an automatic transmission applicable to a shift control method of an automatic transmission according to various embodiments of the present invention.

As shown in FIG. 1, a power train of an automatic transmission that is applicable to a shift control method of an automatic transmission according to various embodiments of the present invention includes first, second, and third planetary gear sets PG1, PG2, and PG3.

The first planetary gear set PG1 is a single pinion planetary gear set, and includes a first sun gear S1, a first planet carrier PC1, and a first ring gear R1 as operational members thereof. A first pinion gear P1, being engaged with the first ring gear R1 and the first sun gear S1, is connected to the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged with the second ring gear R2 and the second sun gear S2, is connected to the second planet carrier PC2.

The third planetary gear set PG3 is a double pinion planetary gear set, and includes a third sun gear S3, a third planet carrier PC3, and a third ring gear R3 as operational members thereof. A third pinion gear P3, being engaged with the third ring gear R3 and the third sun gear S3, is connected to the third planet carrier PC3.

In addition, the power train of an automatic transmission includes an input shaft 100 for receiving torque from an engine (not shown), an output gear 110 for outputting torque from the power train, and a transmission case 120.

According to the power train of an automatic transmission, the first planet carrier PC1 is fixedly connected to the second ring gear R2.

The second planet carrier PC2 is fixedly connected to the third planet carrier PC3.

The first ring gear R1 is fixedly connected to the third ring gear R3.

The third sun gear S3 always acts as an input element by being fixedly connected to the input shaft 100.

The first planet carrier PC1 always acts as an output element by being fixedly connected to the output gear 110.

The third planet carrier PC3 is variably connected to the input shaft 100 via a first clutch C1.

The second sun gear S2 is variably connected to the input shaft 100 via a second clutch C2.

The first sun gear S1 is variably connected to the transmission case 120 via a first brake B1 and is subjected to a stopping operation of the first brake B1.

The second sun gear S2 is variably connected to the transmission case 120 via a second brake B2 and is subjected to a stopping operation of the second brake B2.

The third planet carrier PC3 is variably connected to the transmission case 120 via a third brake B3 and is subjected to a stopping operation of the third brake B3.

In addition, a one-way clutch F1, being disposed between the third planet carrier PC3 and the transmission case 120, is disposed in parallel with the third brake B3.

Figure 2:
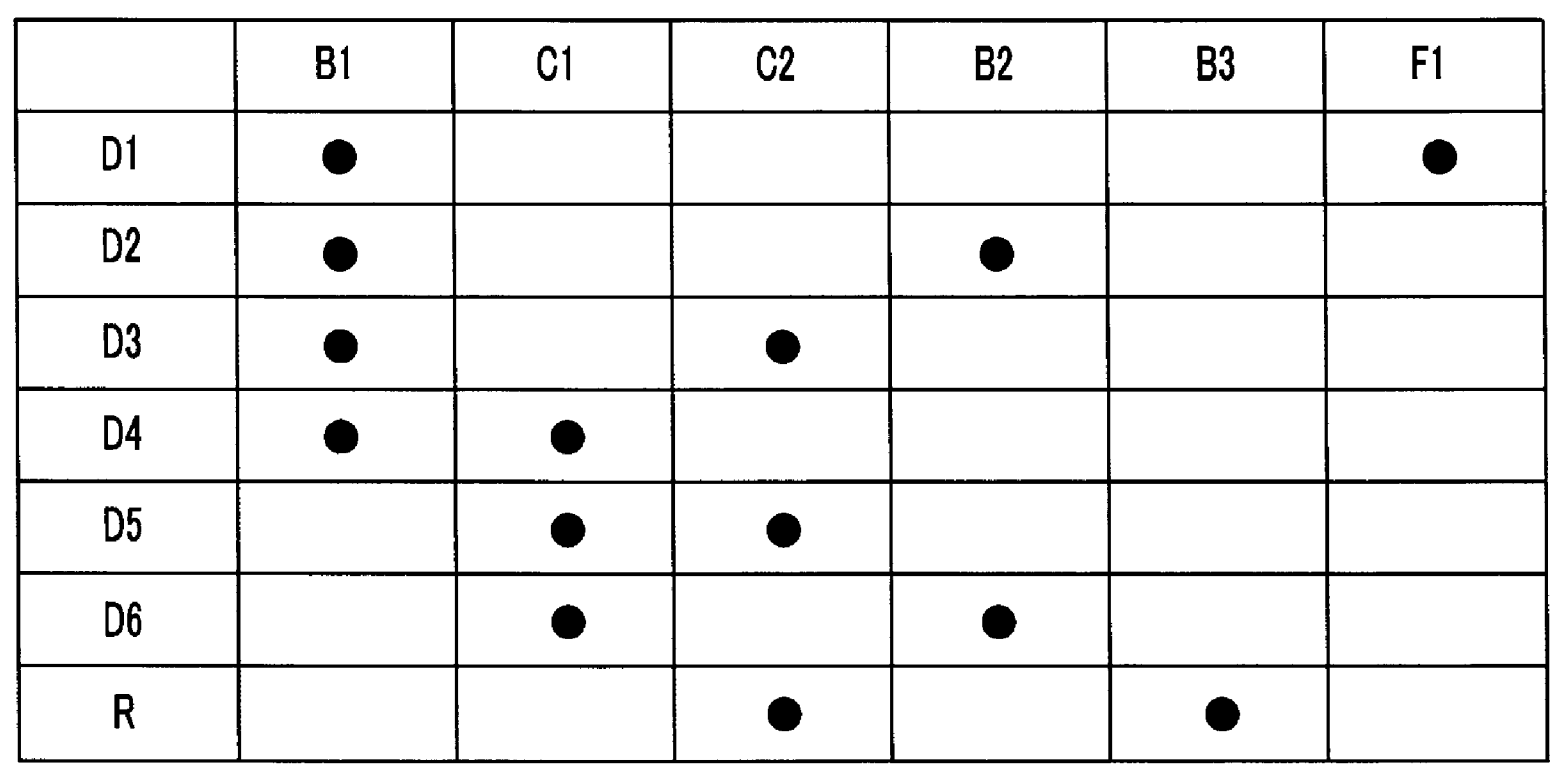

FIG. 2 is an operational chart of a power train of an automatic transmission that is applicable to a shift control method of an automatic transmission according to various embodiments of the present invention.

As shown in FIG. 2, the first brake B1 and the one-way clutch F1 are operated at a first forward speed D1, the first and second brakes B1 and B2 are operated at a second forward speed, and the first brake B1 and the second clutch C2 are operated at a third forward speed D3. The first brake B1 and the first clutch C1 are operated at a fourth forward speed D4, the first and second clutches C1 and C2 are operated at a fifth forward speed D5, and the first clutch C1 and the second brake B2 are operated at a sixth forward speed D6.

In addition, the second clutch C2 and the third brake B3 are operated at a reverse speed R.

Hereinafter, up-shifting processes for the power train of an automatic transmission shown in FIG. 1 will be described in detail.

In a shifting process from the first forward speed D1 to the second forward speed D2, the second brake B2 is operated. In this case, the one-way clutch F1 is automatically released without an additional control.

In a shifting process from the second forward speed D2 to the third forward speed D3, the second brake B2 is released and the second clutch C2 is operated.

In a shifting process from the third forward speed D3 to the fourth forward speed D4, the second clutch C2 is released and the first clutch C1 is operated.

In a shifting process from the fourth forward speed D4 to the fifth forward speed D5, the first brake B1 is released and the second clutch C2 is operated.

In a shifting process from the fifth forward speed D5 to the sixth forward speed D6, the second clutch C2 is released and the second brake B2 is operated.

Down-shifting processes are opposite to the up-shifting processes.

Hereinafter, skip down-shifting processes for the power train of the automatic transmission shown in FIG. 1 will be described in detail.

In a skip-shifting process from the sixth forward speed D6 to the fourth forward speed D4, the second brake B2 is released and the first brake B1 is operated.

In a skip-shifting process from the fifth forward speed D5 to the third forward speed D3, the first clutch C1 is released and the first brake B1 is operated.

In a skip-shifting process from the fourth forward speed D4 to the second forward speed D2, the first clutch C1 is released and the second brake B2 is operated.

In a skip-shifting process from the third forward speed D3 to the first forward speed D1, the second clutch C2 is released. The one-way clutch F1 is automatically operated.

Figure 3:
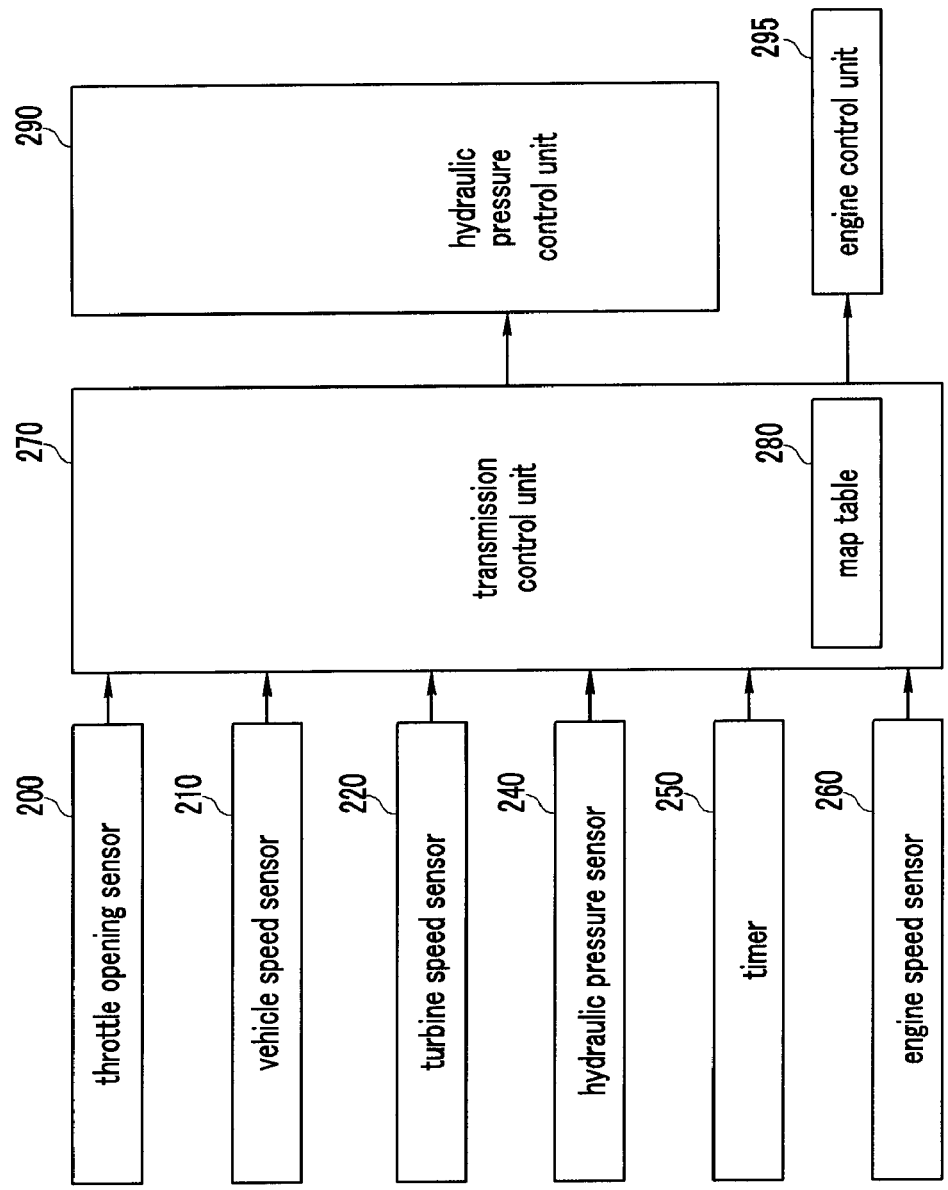
FIG. 3 is a block diagram of an exemplary shift control system of an automatic transmission according to the present invention.

FIG. 3 is a block diagram of a shift control system of an automatic transmission according to various embodiments of the present invention.

As shown in FIG. 3, a shift control system of an automatic transmission according to various embodiments of the present invention includes a throttle opening sensor 200, a vehicle speed sensor 210, a turbine speed sensor 220, a hydraulic pressure sensor 240, a timer 250, an engine speed sensor 260, a transmission control unit 270, a hydraulic pressure control unit 290, and an engine control unit 295.

The throttle opening sensor 200 detects an opening of a throttle valve that is operated in accordance with an operation of an accelerator pedal, and transmits a signal corresponding thereto to the transmission control unit 270.

The vehicle speed sensor 210 is mounted at a wheel bearing (not shown) of a wheel, detects a vehicle speed, and transmits a signal corresponding thereto to the transmission control unit 270.

The turbine speed sensor 220 detects a current turbine speed operated as an input torque of the automatic transmission, and transmits a signal corresponding thereto to the transmission control unit 270.

The hydraulic pressure sensor 240 detects hydraulic pressures applied to respective off-going and on-coming elements, and transmits a signal corresponding thereto to the transmission control unit 270.

The timer 250 detects a time lapse during which a shift is performed, and transmits a signal corresponding thereto to the transmission control unit 270.

The engine speed sensor 260 detects an engine speed from a phase change of a crankshaft (not shown), and transmits a signal corresponding thereto to the transmission control unit 270.

The transmission control unit 270 can be realized by one or more processors activated by a predetermined program, and the predetermined program can be programmed to perform each step of a shift control method of an automatic transmission according to various embodiments of this invention.

The transmission control unit 270 receives a throttle opening signal, a vehicle speed signal, a turbine speed signal, a hydraulic pressure signal, a signal about the time lapse, and an engine speed signal respectively from the throttle opening sensor 200, the vehicle speed sensor 210, the turbine speed sensor 220, the hydraulic pressure sensor 240, the timer 250, and the engine speed sensor 260.

In addition, the transmission control unit 270 generates a hydraulic pressure signal corresponding to the signals, and transmits the hydraulic pressure signal to the hydraulic pressure control unit 290.

In addition, the transmission control unit 270 includes a map table 280.

The throttle opening in accordance with the vehicle speed at each shift-speed is stored in the map table 280. Therefore, the transmission control unit 270 calculates a target shift-speed in accordance with the throttle opening signal and the vehicle speed signal, and determines whether a shifting condition is satisfied.

In addition, off-going pressure of an off-going element and on-coming pressure of an on-coming element at each shift-speed are stored in the map table 280.

Further, gear ratios at each shift-speed are also stored in the map table 280.

Such throttle opening, on-coming and off-going pressures, and gear ratios stored in the map table 280 may be set by a person of ordinary skill in the art according to vehicle and engine types that are applicable to a shift control method of an automatic transmission according to various embodiments of the present invention.

The hydraulic pressure control unit 290 receives the hydraulic pressure signal from the transmission control unit 270 and controls the hydraulic pressure supplied to respective off-going and on-coming elements. The hydraulic pressure control unit 290 includes at least one of control valves and solenoid valves that control the hydraulic pressure applied to respective off-going and on-coming elements.

The engine control unit 295 performs an engine torque reduction control according to a control signal of the transmission control unit 270. Generally, the engine torque reduction control is performed by delaying ignition timing or reducing the throttle opening.

Hereinafter, referring to FIG. 4, a shift control method of an automatic transmission according to various embodiments of the present invention will be described in detail.

Figure 4:
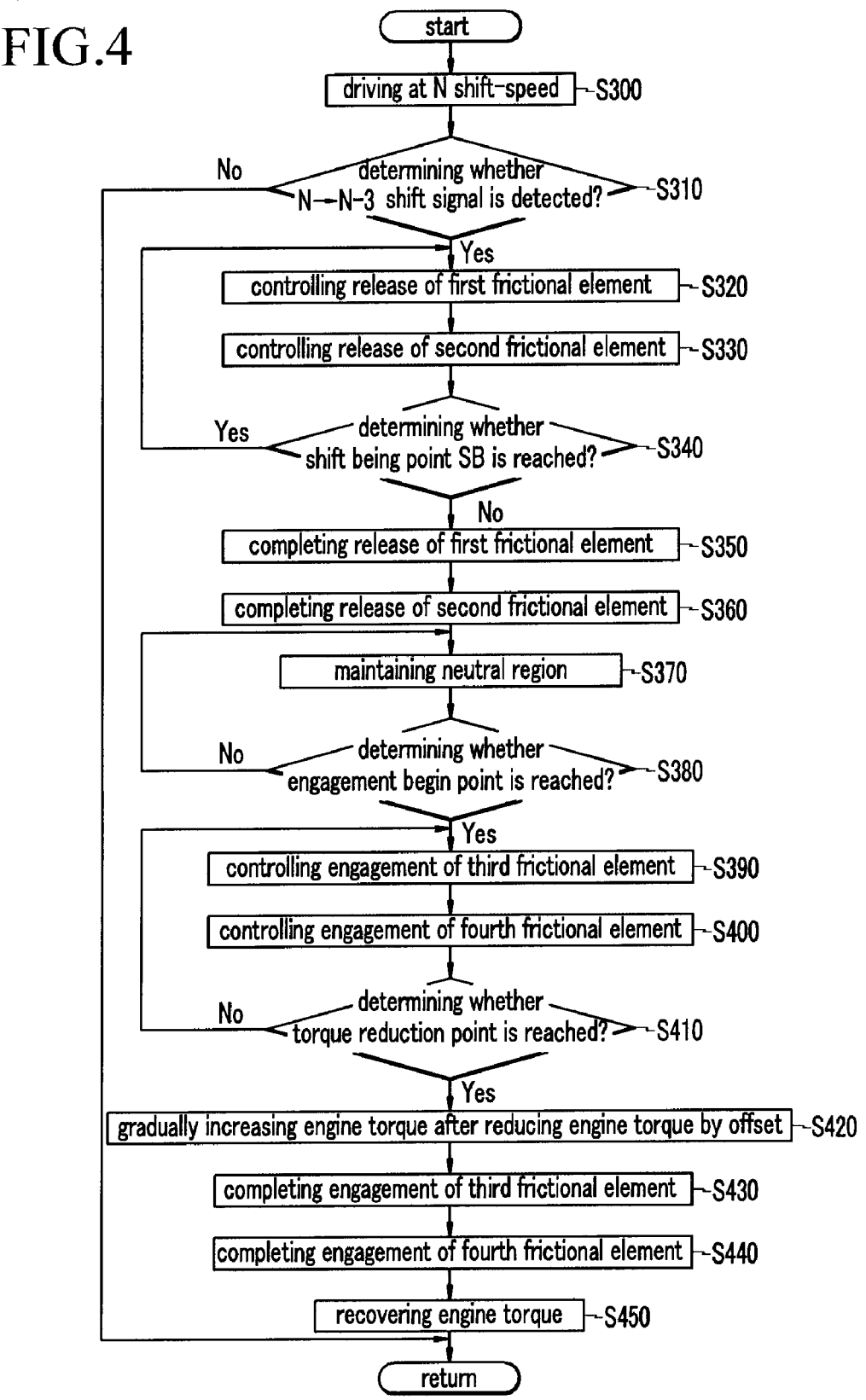
FIG. 4 is a flowchart showing an exemplary shift control method of an automatic transmission according to the present invention.

FIG. 4 is a flowchart showing a shift control method of an automatic transmission according to various embodiments of the present invention.

In a shift control method of an automatic transmission according to various embodiments of the present invention, an N shift speed may be achieved by engagement of first and second frictional elements, and an N–3 shift speed be achieved by engagement of third and fourth frictional elements.

As shown in FIG. 4, in a state in which a vehicle is driven at the N shift-speed at step S300, the transmission control unit 270 determines whether N to N–3 shift signal is detected at step S310. The N to N–3 shift signal is generated when the throttle opening in accordance with the vehicle speed is larger than or equal to a predetermined throttle opening.

If the transmission control unit 270 does not detect the N to N–3 shift signal, the transmission control unit 270 finishes the shift control method according to various embodiments of the present invention, and maintains a current control condition.

If the transmission control unit 270 detects the N to N–3 shift signal, the transmission control unit 270 begins release of the first frictional element at step S320 and begins release of the second frictional element at step S330. The releases of the first and second frictional elements are simultaneously controlled.

Here, the release control of the frictional element means that the hydraulic pressure applied to the frictional element is reduced to 0 according to a predetermined pattern.

While the releases of the first and second frictional elements are controlled as described above, the transmission control unit 270 determines whether a shift begin point SB is reached at step S340.

If the shift begin point SB is not reached at the step S340, the transmission control unit 270 continues to perform the releases of the first and second frictional elements at the steps S320 and S330. If the shift begin point SB is reached at the step S340, the transmission control unit 270 completes the release of the first frictional element at step S350, and completes the release of the second frictional element at step S360.

After that, the transmission control unit 270 maintains a neutral region at step S370. As described above, in a case in which the off-going elements are released without engagements of the on-coming elements, the automatic transmission becomes a neutral state. In this case, the engine speed rises, and the turbine speed also rises according to the rise of the engine speed. Therefore, the transmission control unit 270 makes the turbine speed increase according to increase of the engine speed without controlling the hydraulic pressure supplied to the frictional elements at the step S370.

During the turbine speed increases, the transmission control unit 270 determines whether an engagement begin point is reached at step S380. The engagement begin point means a point when the hydraulic pressure is started to be supplied to the third and fourth frictional elements.

If the engagement begin point is not reached at the step S380, the transmission control unit 270 continues to maintain the neutral region at the step S370. If the engagement begin point is reached at the step S380, the transmission control unit 270 beings an engagement of the third frictional element at step S390, and begins an engagement of the fourth frictional element at step S400. The engagement controls of the third and fourth frictional elements may be simultaneously performed.

Here, the engagement control of the frictional element means that the hydraulic pressure applied to the frictional element is increased according to the predetermined pattern so as to engage the frictional element.

While the engagements of the third and fourth frictional elements are controlled as described above, the transmission control unit 270 determines whether a torque reduction point is reached at step S410.

If the torque reduction point is not reached at the step S410, the transmission control unit 270 continues to control the engagements of the third and fourth frictional elements at the steps S390 and S400. If the torque reduction point is reached at the step S410, the transmission control unit 270 makes the engine control unit 295 perform a torque reduction control at step S420. The engine torque reduction control is performed by gradually increasing the engine torque after the engine torque is reduced by an offset.

After that, the transmission control unit 270 completes the engagement of the third frictional element at step S430, and completes the engagement of the fourth frictional element at step S440.

If the engagements of the third and fourth frictional elements are completed, the transmission control unit 270 make the engine control unit 295 recover the engine torque at step S450, and the shift control method of an automatic transmission according to various embodiments of the present invention is finished.

Figure 5:
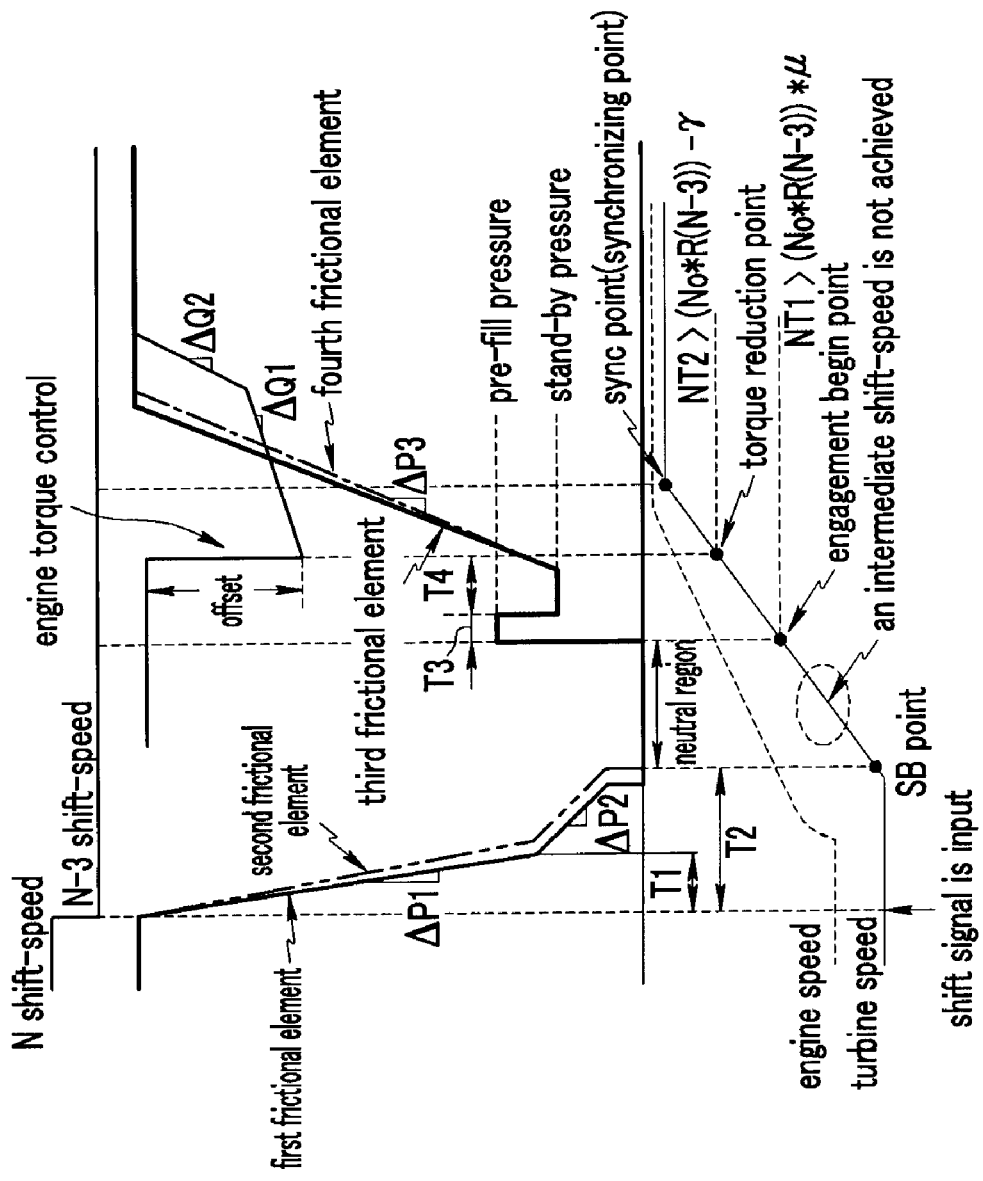
FIG. 5 is a graph showing a control hydraulic pressure signal, a turbine speed, and an engine speed of an exemplary shift control method of an automatic transmission according to the present invention.
Figure 6:
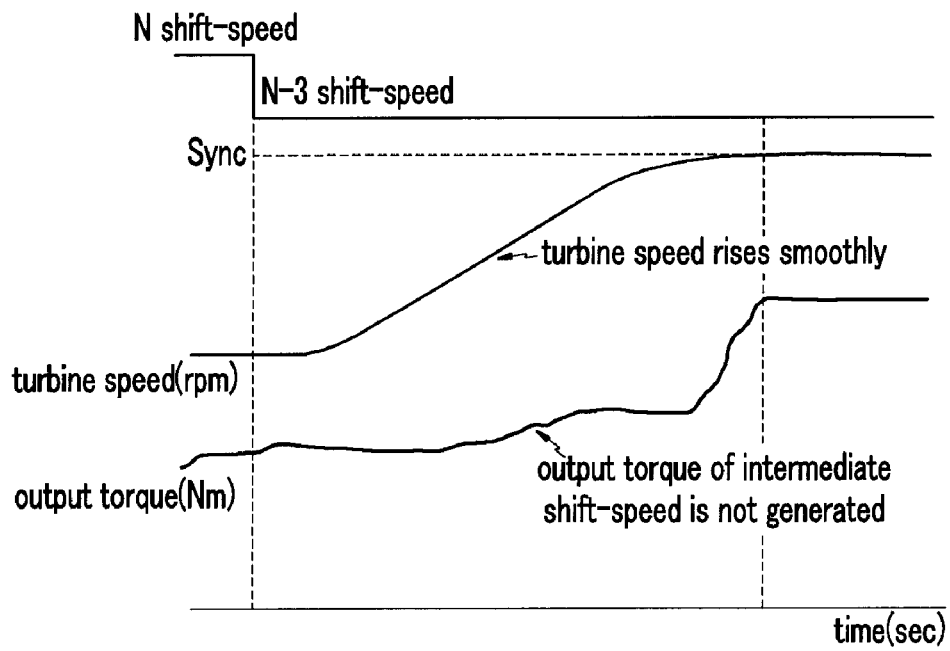
FIG. 6 is a graph showing a turbine speed and an output torque in a case that a shift is performed according to an exemplary shift control method of the present invention.

Referring to FIG. 5, the shift control method of an automatic transmission according to various embodiments of the present invention will be described in further detail.

FIG. 5 is a graph showing a control hydraulic pressure signal, a turbine speed, and an engine speed of a shift control method of an automatic transmission according to various embodiments of the present invention.

In a case that the shift control method of an automatic transmission according to various embodiments of the present invention is applied to a 6 to 3 shift, the first, second, third, and fourth frictional elements are shown in Table 1.

TABLE 1

| first frictional element | second frictional element | third frictional element | fourth frictional element |
|---|---|---|---|
| second brake | first clutch | second clutch | first brake |

As shown in FIG. 5, the first and second frictional elements are release just as one frictional element is released, and the third and fourth frictional elements are engaged just as one frictional element is engaged. However, the first and second frictional elements may be released according to different patterns from each other, and the third and fourth frictional elements may be engaged according to different patterns from each other.

As shown in FIG. 5, in a state that the N shift-speed is maintained, the transmission control unit 270 received the shift signal and releases the first and second frictional elements. That is, if the shift signal is input, the transmission control unit 270 reduces the hydraulic pressure supplied to the first and second frictional elements by a first hydraulic pressure slope $\Delta P1$ during a first predetermined time T1, and reduces the hydraulic pressure by a second hydraulic pressure slope $\Delta P2$ until the shift begin point SB.

If the shift begin point SB is reached, the transmission control unit 270 quickly reduces the hydraulic pressure supplied to the first and second frictional elements to 0. For the purposes of the present invention, "quickly" means fast in occurrence or done with rapidity. The shift begin point SB may be a point when a second predetermined time T2 has passed after the shift signal is input.

After that, the transmission control unit 270 maintains the neutral region. At this time, the turbine speed increases according to increase of the engine speed.

If the turbine speed increases, the transmission control unit 270 determines whether the engagement begin point is reached. The engagement begin point may be reached when a current turbine speed is faster than or equal to a first predetermined turbine speed Nt1, and the first predetermined turbine speed Nt1 is shown from equation 1.

$$Nt1 = (No * R(N-3)) * \mu$$  Equation 1.

Here, No is the engine speed, R(N−3) is a gear ratio of the N−3 shift-speed, and $\mu$ is a constant. The $\mu$ may be 0.5 or may be an arbitrary value according to design scheme.

If the engagement begin point is reached, the transmission control unit 270 controls the engagements of the third and fourth frictional elements. That is, the hydraulic pressure supplied to the third and fourth frictional elements is quickly increased to a pre-fill pressure, and then, the pre-fill pressure is maintained during a third predetermined time T3 such that oil is filled in hydraulic pressure lines for supplying the hydraulic pressure to the third and fourth frictional elements. After that, the hydraulic pressure supplied to the third and fourth frictional elements is quickly reduced to a stand-by pressure, and then, the stand-by pressure is maintained during a fourth predetermined time T4 so as to reduce shift shock. After that, the hydraulic pressure supplied to the third and fourth frictional elements is increased by a third hydraulic pressure slope $\Delta P3$.

Meanwhile, while the engagements of the third and fourth frictional elements are controlled, the transmission control unit 270 determines whether the torque reduction point is reached. The torque reduction point is reached when the current turbine speed is faster than or equal to a second predetermined turbine speed Nt2, and the second predetermined turbine speed Nt2 is shown in equation 2.

$$Nt = (No * R(N-3)) \Delta \gamma$$  Equation 2.

Here, $\gamma$ may be 200 rpm or may be an arbitrary value according to design scheme.

If the torque reduction point is reached, the engine control unit 295 performs the engine torque reduction control. The engine torque reduction control is performed by gradually increasing the engine torque by a first predetermined torque slope $\Delta Q1$ after the engine torque is quickly reduced by the offset. In addition, the offset is determined according to a turbine speed slope.

Since off-going and on-coming pressures are not supplied to the frictional elements in the neutral region according to various embodiments of the present invention, the turbine speed tend to increase greatly. Therefore, if the engine torque reduction control is not performed, the shift shock may occur.

While the engine control unit 295 performs the engine torque reduction control, the transmission control unit 270 increases the hydraulic pressure supplied to the third and fourth frictional elements so as to complete the engagements of the third and fourth frictional elements.

If the engagements of the third and fourth frictional elements are completed, the engine control unit 295 recovers the engine torque. The recovery of the engine torque is performed by gradually increasing the engine torque by a second predetermined torque slope ΔQ2.

Figure 7:
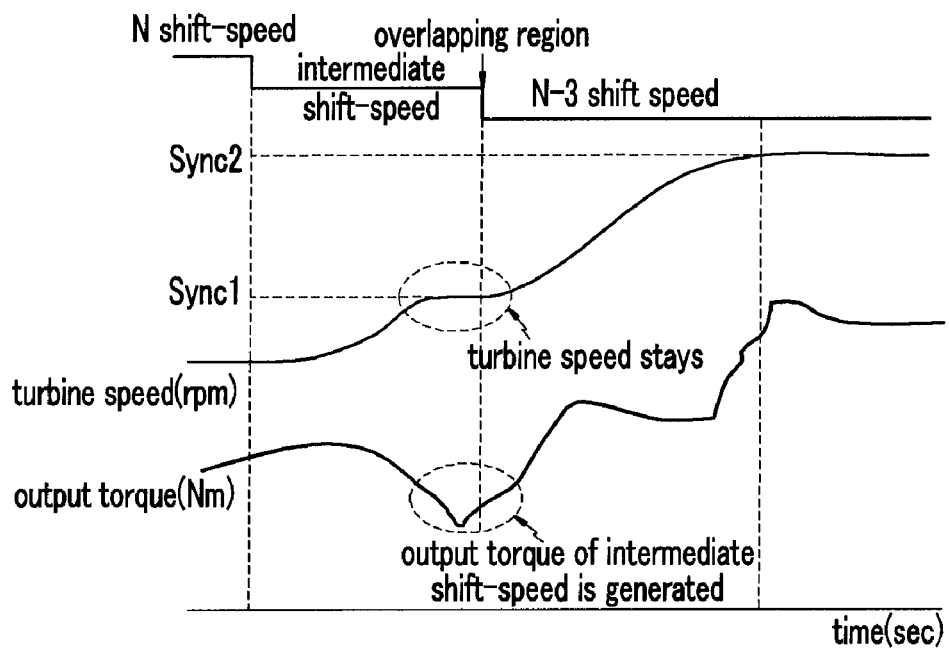
FIG. 7 is a graph showing a turbine speed and an output torque when a shift is performed according to the present invention.

As shown in FIG. 7, turbine speed rises smoothly, and fluctuation of output torque is small when the turbine speed passes through an intermediate shift-speed according to various embodiments of the present invention. Therefore, shift feel may be improved.

In addition, since two frictional elements are engaged after two other frictional elements are released, hydraulic pressure control may be facilitated.

Further, since on-coming elements are engaged according to the same pattern and the off-going elements are released according to the same pattern, the hydraulic pressure control may be further facilitated.

Since an intermediate shift-speed between an N shift-speed and an N−3 shift-speed is not achieved when a shift from the N shift-speed to the N−3 shift-speed is performed according to various embodiments of the present invention, shift feel may be improved.

In addition, since the first and second frictional elements are simultaneously released and the third and fourth frictional elements are simultaneously engaged, hydraulic pressure control may be facilitated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method of an automatic transmission, the method comprising:
    performing a skip shift from a first shift-speed achieved by engagements of first and second frictional elements to a second shift-speed achieved by engagements of third and fourth frictional elements;
    performing the engagements of the third and fourth frictional elements after completion of releases of the first and second frictional elements; and
    performing engine torque reduction control when the engagements of the third and fourth frictional elements are performed.

2. The shift control method of claim 1, wherein the releases of the first and second frictional elements are simultaneously performed.

3. The shift control method of claim 1, wherein the engagements of the third and fourth frictional elements are simultaneously performed.

4. The shift control method of claim 1, wherein the releases of the first and second frictional elements are completed at a shift begin point.

5. The shift control method of claim 4, wherein the releases of the first and second frictional elements comprises:
    reducing hydraulic pressure by a first hydraulic pressure slope until a first predetermined time after a shift signal is input;
    reducing the hydraulic pressure by a second hydraulic pressure slope from the first predetermined time to the shift begin point; and
    reducing the hydraulic pressure to 0.

6. The shift control method of claim 4, wherein the shift begin point is a point when a second predetermined time has passed after the shift signal is input.

7. The shift control method of claim 1, wherein the engagements of the third and fourth frictional elements begins when an engagement begin point is reached after the completion of the releases of the first and second frictional elements.

8. The shift control method of claim 7, wherein a turbine speed is increased by increase of an engine speed without controlling the hydraulic pressure supplied to the frictional elements from the shift begin point to the engagement begin point.

9. The shift control method of claim 7, wherein the engagement begin point is reached when the turbine speed is faster than or equal to a first predetermined turbine speed.

10. The shift control method of claim 7, wherein the engagements of the third and fourth frictional elements comprises:
    maintaining a pre-fill pressure during a third predetermined time after the hydraulic pressure is increased to the pre-fill pressure;
    maintaining a stand-by pressure during a fourth predetermined time after the hydraulic pressure is reduced to the stand-by pressure; and
    increasing the hydraulic pressure by a third hydraulic pressure slope.

11. The shift control method of claim 7, wherein an engine torque reduction control begins when a torque reduction point is reached while engaging the third and fourth frictional elements.

12. The shift control method of claim 11, wherein the engine torque reduction control comprises:
    reducing an engine torque by an offset; and
    increasing the engine torque gradually until the engagements of the third and fourth frictional elements are completed.

13. The shift control method of claim 12, wherein the offset is determined according to a turbine speed slope.

14. The shift control method of claim 11, wherein the torque reduction point is reached when the turbine speed is faster than or equal to a second predetermined turbine speed.

15. The shift control method of claim 12, wherein the engine torque reduction control further comprises recovering the engine torque in a case that the engagements of the third and fourth frictional elements are completed.

16. A shift control system of an automatic transmission comprising a transmission control unit controlling a shift and an engine control unit controlling an engine torque, based on a driving condition of a vehicle,
    wherein the transmission control unit controls the shift from a first shift-speed achieved by engagements of first and second frictional elements to a second shift-speed achieved by engagement of third and fourth frictional elements, and
    wherein the transmission control unit controls the engagements of the third and fourth frictional elements after the engagements of the first and second frictional elements are completed,
    wherein engine torque reduction control is performed when the engagements of the third and fourth frictional elements are performed.

17. The shift control system of claim 16, wherein releases of the first and second frictional elements are simultaneously performed.

18. The shift control system of claim 16, wherein the engagements of the third and fourth frictional elements are simultaneously performed.

19. The shift control system of claim 16, wherein the transmission control unit controls the releases of the first and second frictional elements to be completed at a shift begin point.

20. The shift control system of claim 16, wherein the transmission control unit begins the engagements of the third and fourth frictional elements when an engagement begin point is reached after the releases of the first and second frictional elements are completed.

21. The shift control system of claim 20, wherein the engagement begin point is reached when a turbine speed is faster than or equal to a first predetermined turbine speed.

22. The shift control system of claim 16, wherein the engine control unit performs an engine torque reduction control when a torque reduction point is reached while the transmission control unit controls the engagements of the third and fourth frictional elements.

23. The shift control system of claim 22, wherein the torque reduction point is reached when the turbine speed is faster than or equal to a second predetermined turbine speed.

24. The shift control system of claim 22, wherein the engine control unit recovers an engine torque after the transmission control unit completes the engagements of the third and fourth frictional elements.

25. A shift control method of an automatic transmission that controls a skip shift from a first shift-speed achieved by an engagement of at least one off-going element to a second shift-speed achieved by an engagement of at least one on-coming element, the method comprising:
    performing a shift control after a release of the off-going element is completed such that an intermediate shift-speed between the first shift-speed and the second shift-speed is not achieved, and
    performing engine torque reduction control when the engagement of the at least one on-coming element is performed.

26. The shift control method of claim 25, wherein a neutral control where hydraulic pressure supplied to the on-coming and off-going elements is not controlled is performed before the on-coming element is engaged after the off-going element is released.

27. A shift control method of an automatic transmission that controls a skip shift from a first shift-speed to a second shift-speed, the method comprising:
    performing an engagement of an on-coming element that is engaged at the second shift-speed after a release control of an off-going element that is engaged at the first shift-speed begins, and the engagement of the on-coming element is completed after the release of the off-going element is completed, and wherein the release control of the off-going elements are simultaneously begun in a case that at least two off-going elements exist, and
    performing engine torque reduction control when the engagement of the on-coming element is performed.

28. A shift control method of an automatic transmission that controls a skip shift from a first shift-speed to a second shift-speed, the method comprising:
    performing an engagement of at least one on-coming element that is engaged at the second shift-speed after a release control of at least one off-going element that is engaged at the first shift-speed begins, and the engagement of at least one on-coming element is completed after the release of at least one off-going element is completed,
    completing the engagements of the on-coming elements simultaneously in a case that at least two on-coming elements exist, and
    performing engine torque reduction control when the engagement of the at least one on-coming element is performed.

29. A shift control method of an automatic transmission that controls a skip shift from a first shift-speed to a second shift-speed, the method comprising:
    performing a neutral control where hydraulic pressure supplied to frictional elements is not controlled before an engagement of at least one on-coming element that is engaged at the second shift-speed begins after a release control of at least one off-going element that is engaged at the first shift-speed begins,
    performing engine torque reduction control when the engagement of the at least one on-coming element is performed.

30. A shift control method of an automatic transmission that controls a skip shift from a first shift-speed achieved by engagements of first and second frictional elements to a second shift-speed achieved by engagements of third and fourth frictional elements and shifted by two speed steps from the first shift-speed, the method comprising:
    performing a neutral control where hydraulic pressure supplied to the frictional elements is not controlled before the engagements of the third and fourth frictional elements are controlled after the releases of the first and second frictional elements are completed, and
    performing engine torque reduction control when the engagements of the third and fourth frictional elements are performed.

* * * * *